(12) United States Patent
Botkin

(10) Patent No.: US 9,364,102 B2
(45) Date of Patent: Jun. 14, 2016

(54) SUPPORT SYSTEMS AND COMPONENTS FOR SAME

(71) Applicant: Kirk J. Botkin, Indianapolis, IN (US)

(72) Inventor: Kirk J. Botkin, Martinsville, IN (US)

(73) Assignee: Kirk J. Botkin, Indianapolis, IN (US)

( * ) Notice: Subject to any disclaimer, the term of this patent is extended or adjusted under 35 U.S.C. 154(b) by 0 days.

(21) Appl. No.: 14/048,739

(22) Filed: Oct. 8, 2013

(65) Prior Publication Data

US 2014/0190916 A1 Jul. 10, 2014

Related U.S. Application Data

(63) Continuation of application No. 12/525,440, filed on Jul. 31, 2009, now Pat. No. 8,550,265, which is a continuation of application No. PCT/US2008/052691, filed on Jan. 31, 2008.

(60) Provisional application No. 60/898,538, filed on Jan. 31, 2007.

(51) Int. Cl.
| | |
|---|---|
| *A47F 5/00* | (2006.01) |
| *A47B 96/06* | (2006.01) |
| *A47F 5/08* | (2006.01) |
| *F16B 12/26* | (2006.01) |

(52) U.S. Cl.
CPC ............ *A47F 5/0043* (2013.01); *A47B 96/067* (2013.01); *A47F 5/0823* (2013.01); *A47F 5/0846* (2013.01); *F16B 12/26* (2013.01)

(58) Field of Classification Search
CPC ... A47F 5/0043; A47F 5/0823; A47F 5/0846; A47B 96/067; F16B 12/10; F16B 12/20; F16B 12/26

USPC ............ 211/57.1, 59.1, 90.01, 85.3, 94.01, 211/105.1, 106.1, 87.01; 248/220.31, 248/220.42, 220.43, 222.51
See application file for complete search history.

(56) References Cited

U.S. PATENT DOCUMENTS

| | | | |
|---|---|---|---|
| 1,752,272 A | | 3/1930 | Kandel |
| 2,674,431 A | | 4/1954 | Attwood |
| 2,839,350 A | | 6/1958 | Hill et al. |
| 2,881,877 A | | 4/1959 | Olsen |
| 4,308,961 A | | 1/1982 | Kunce |
| 4,334,372 A | * | 6/1982 | Colmar .......................... 40/650 |
| 4,598,504 A | | 7/1986 | Itagaki |
| 4,726,554 A | | 2/1988 | Sorrell |
| 4,765,575 A | | 8/1988 | Bergl et al. |
| 5,198,644 A | | 3/1993 | Pfeiffer et al. |
| 5,237,767 A | * | 8/1993 | Kringel et al. ................. 40/652 |
| 5,351,740 A | | 10/1994 | Hanna |
| 5,375,357 A | * | 12/1994 | Butcher et al. ............. 40/661.06 |
| 5,553,412 A | | 9/1996 | Briechle et al. |

(Continued)

*Primary Examiner* — Korie H Chan

(74) *Attorney, Agent, or Firm* — Woodard, Emhardt, Moriarty, McNett & Henry LLP

(57) ABSTRACT

Support systems for supporting useful articles such as shelves, racks, bars or hooks include a support structure that can be attached to the article. The support structure defines a shaped channel, and an insert component of the system is receivable within the channel and has an exterior surface shaped to correspond to the shaped channel. The shaped channel can define one or multiple grooves, and the insert component can have one or multiple ribs that cooperate with the grooves to stabilize the insert component/support structure combination. The insert component can include at least one displaceable rib element for cooperating with a groove of the support structure.

10 Claims, 14 Drawing Sheets

(56) References Cited

U.S. PATENT DOCUMENTS

| | | |
|---|---|---|
| 6,050,426 A | 4/2000 | Leurdijk |
| 6,069,596 A * | 5/2000 | Marvin et al. ............... 345/52 |
| 6,119,990 A * | 9/2000 | Kump et al. ............ 248/220.22 |
| 6,367,752 B1 * | 4/2002 | Forsythe et al. ......... 248/220.21 |
| 6,631,813 B1 | 10/2003 | Walter et al. |
| 6,698,701 B1 | 3/2004 | Dalton |
| 6,769,656 B1 | 8/2004 | Botkin et al. |
| 6,837,384 B2 | 1/2005 | Secondino |
| 7,137,515 B1 | 11/2006 | Lawson et al. |

* cited by examiner

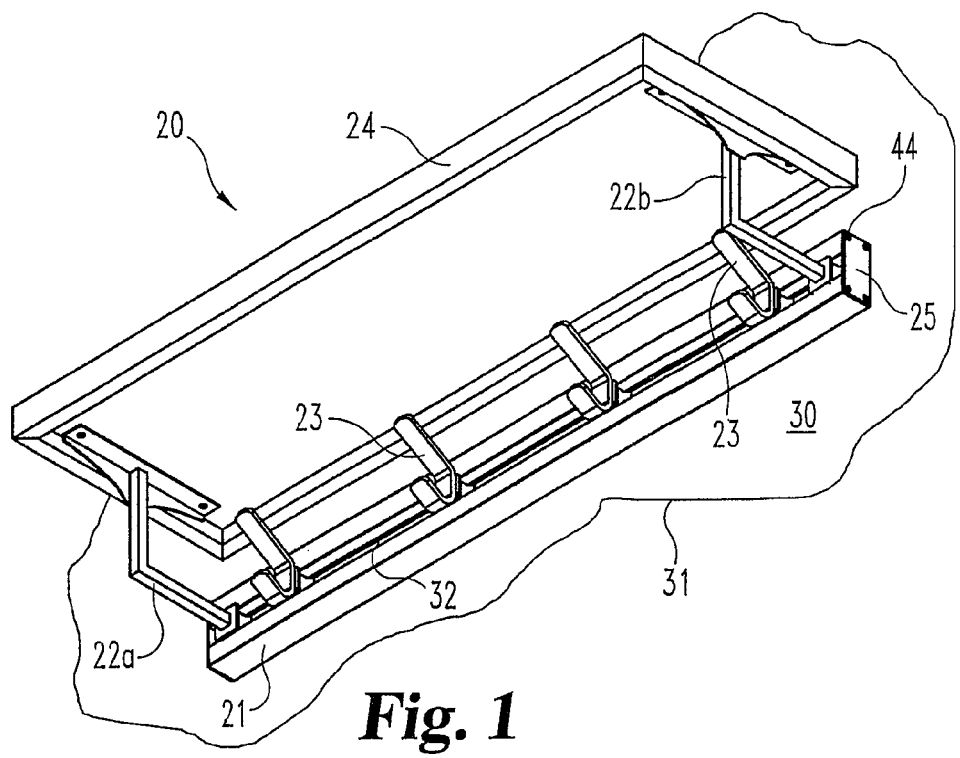
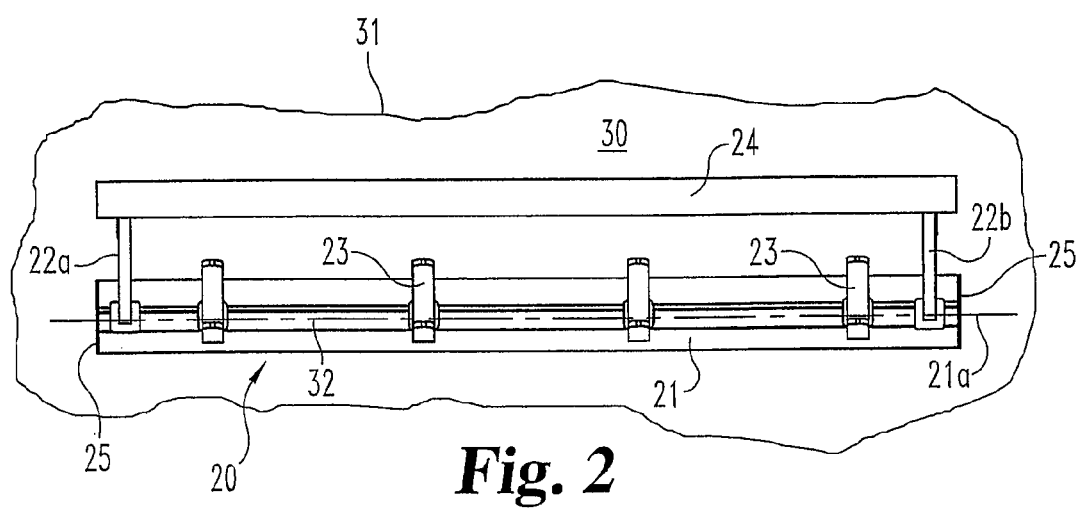

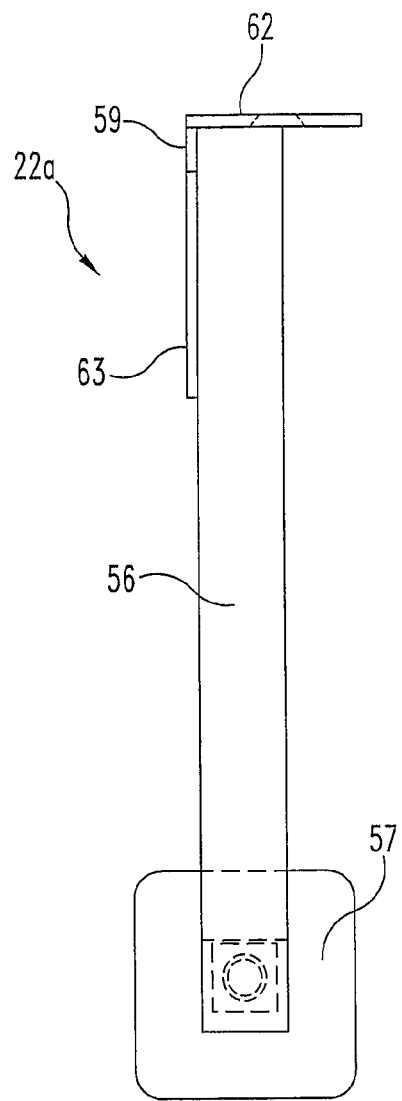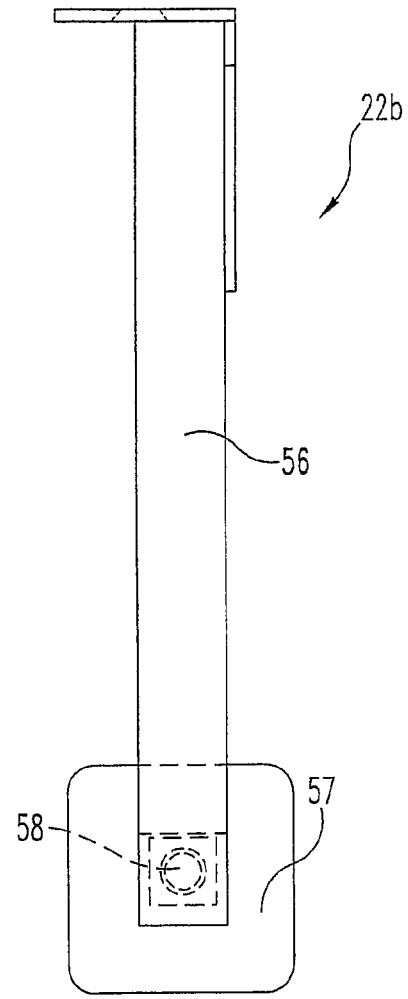
*Fig. 10A*  *Fig. 10B*

SUPPORT SYSTEMS AND COMPONENTS FOR SAME

REFERENCE TO RELATED APPLICATION

The present application claims the benefit of U.S. Provisional Patent Application Ser. No. 60/898,538 filed Jan. 31, 2007 entitled SUPPORT SYSTEMS AND COMPONENTS USEFUL FOR HOOK AND/OR SHELVING ARRANGEMENTS, which is hereby incorporated by reference in its entirety.

BACKGROUND OF THE INVENTION

Retailers and product manufacturers are in the business of selling products, and to stay competitive, they must continually consider how products are perceived by customers. Although product fixtures by their very function typically serve a supporting role, they are an important component in creating customer perception. One function of product display fixtures is to facilitate profitability by enhancing products while maximizing use of retail space. While retailers of lower end products may focus more on the retail space aspect and higher end retailers focus more on enhancing the imaging of products and the retail store, both types of retailers use product fixtures to increase sales.

A poorly designed, manufactured, installed or maintained fixture can destroy an otherwise positive product image. A product fixture should focus attention on the product and never call attention to itself by wobbling or impeding access to the product. Such problems are frustrating to shoppers who may then unconsciously associate poor quality with the product or the store.

Certain products are best displayed with faceout or waterfall displays. Such displays allow product, such as garments, to be stored and displayed in an optimal way for highlighting the product and ensuring that sufficient stock is ready and available for selection and purchase. Faceout and waterfall display brackets can be mounted on freestanding fixtures or wall standards.

Freestanding fixtures provide flexibility because they can be moved around the store, however they present an additional stability problem. Such displays can wobble. The problem is magnified with the use of faceout and waterfall accessories, which can increase the wobble factor. The instability of some chrome fixtures is a safety issue and also detracts from the customer's shopping experience; both of which can negatively affect profitability.

Wall standards are typically elongated chrome structures having numerous slots for attachment of brackets for display devices, such as shelves, hooks, faceouts and waterfall displays. One advantage of the use of wall standards is that the display devices can be placed at various levels as products and stock changes. Wall standards also provide some stability if installed properly. Unfortunately, the stability provided by prior art wall mounts has been limited by the security of the engagement of the slot to the attachment members provided on the display members.

In addition to stability issues, typical slot walls, whether of metal or wood, require a great deal of labor to manufacture. It would be preferable to bore holes, however it has been difficult to create a single piece fixture that can be readily engaged and disengaged with a bored opening. Pegs created for round holes freely rotate and cannot support a cantilever bracket of any length. Moreover, the typical chrome displays do not tend to enhance the image of products and stores. Many high-end retailers and manufacturers continue to seek product displays that support and enhance the desired image.

One solution to the need for attractive image-enhancing fixtures that are economical and versatile is disclosed in U.S. Pat. No. 6,769,656 and its continuation, U.S. Pat. No. 7,051,984. The '656 patent issued on Aug. 3, 2004 to Botkin, et al. The '984 patent issued on May 30, 2006 to Botkin. While the '656 and '984 patents disclose and claim design fixtures with positive image qualities that are functional, stable, versatile, and space-efficient, there remains the opportunity for other types and styles of design fixtures with many of these same characteristics. Disclosed herein is an example of such other types and styles of design fixtures.

BRIEF SUMMARY

In one embodiment, provided is a system for the presentation or storage of articles comprising an elongated support rail defining a shaped channel, the elongated support rail being constructed and arranged for secure connection to a support structure, at least one insert component defining an interior opening, the at least one insert component having a shaped exterior corresponding to a portion of the shaped channel, at least one shelf support member including a securement portion constructed and arranged for receipt by the internal opening of a corresponding insert component and a shelf attached to the at least one shelf support member.

In other embodiments, provided are support systems or apparatuses including at least one support structure, such as a rail or receiver, defining a shaped channel. The systems include one or multiple insert components having a shaped exterior corresponding to a portion of the shaped channel. The support systems can be attached to and used to support a broad variety of utilitarian structures such as shelves, cabinets, drawers, hangbars, racks, and the like.

In other embodiments, provided are components for support systems as discussed herein, including inventive rails, receivers, and insert components, as well as their combination with other parts of the described systems.

In other embodiments, provided are methods for supporting utilitarian articles using support systems as described herein, and methods for making support systems as described herein.

Additional embodiments as well as features and advantages of the invention will be apparent from the descriptions herein.

BRIEF DESCRIPTION OF THE SEVERAL VIEWS OF THE DRAWINGS

FIG. 1 is a perspective view of a display system according to a typical embodiment of the present invention.

FIG. 2 is a front elevational view of the FIG. 1 display system.

FIG. 10A is a rear elevational view of the FIG. 7A left shelf arm.

FIG. 10B is a rear elevational view of the FIG. 7B right shelf arm.

DETAILED DESCRIPTION

Figure 3:
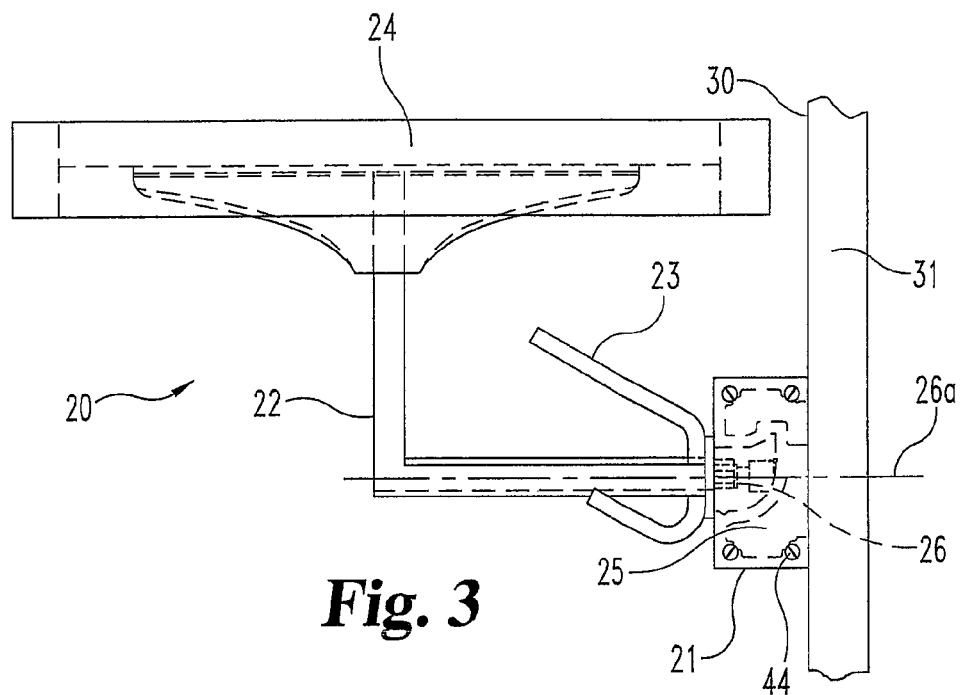
FIG. 3 is a side elevational view of the FIG. 1 display system.
Figure 4:
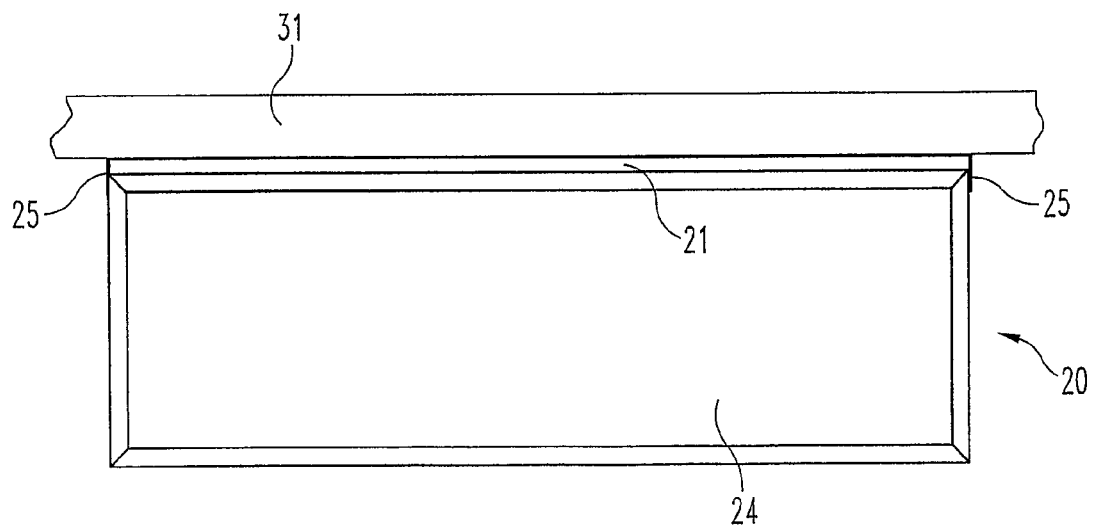
FIG. 4 is a top plan view of the FIG. 1 display system.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and is use, and such further applications of the principles of the disclosure as illustrated therein being contemplated as would normally occur to one skilled in the art to which the disclosure relates.

Figure 5:
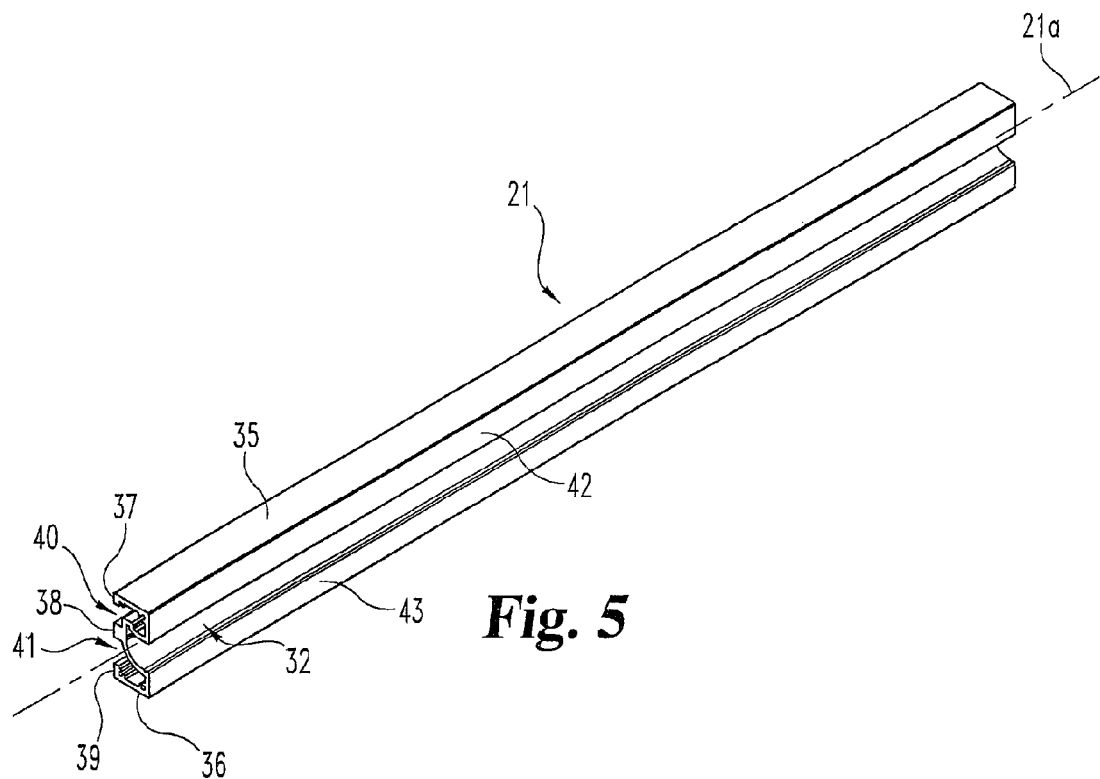
FIG. 5 is a perspective view of an extruded rail comprising one portion of the FIG. 1 display system.
Figure 6:
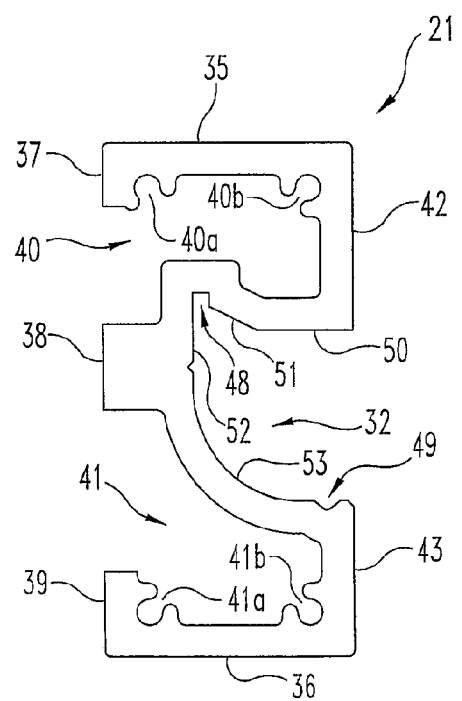
FIG. 6 is an end elevational view of the FIG. 5 rail.
Figure 7A:
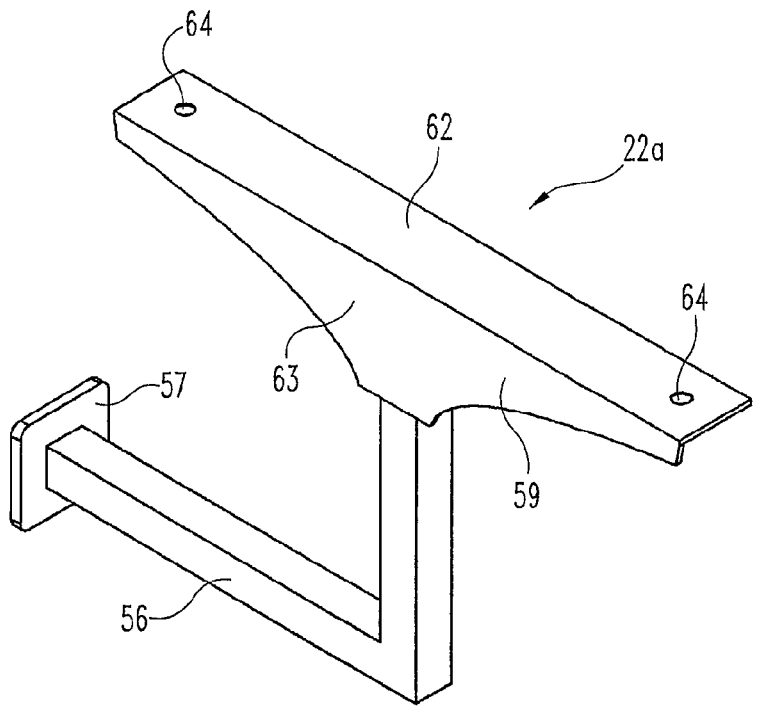
FIG. 7A is a perspective view of a left shelf arm comprising one portion of the FIG. 1 display system.
Figure 7B:
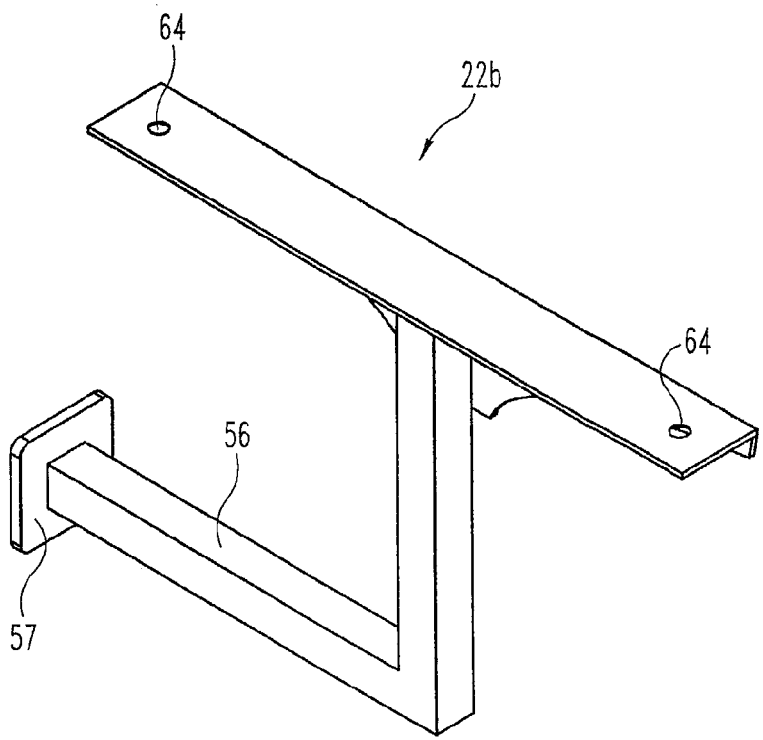
FIG. 7B is a perspective view of a right shelf arm comprising one portion of the FIG. 1 display system.
Figure 8A:
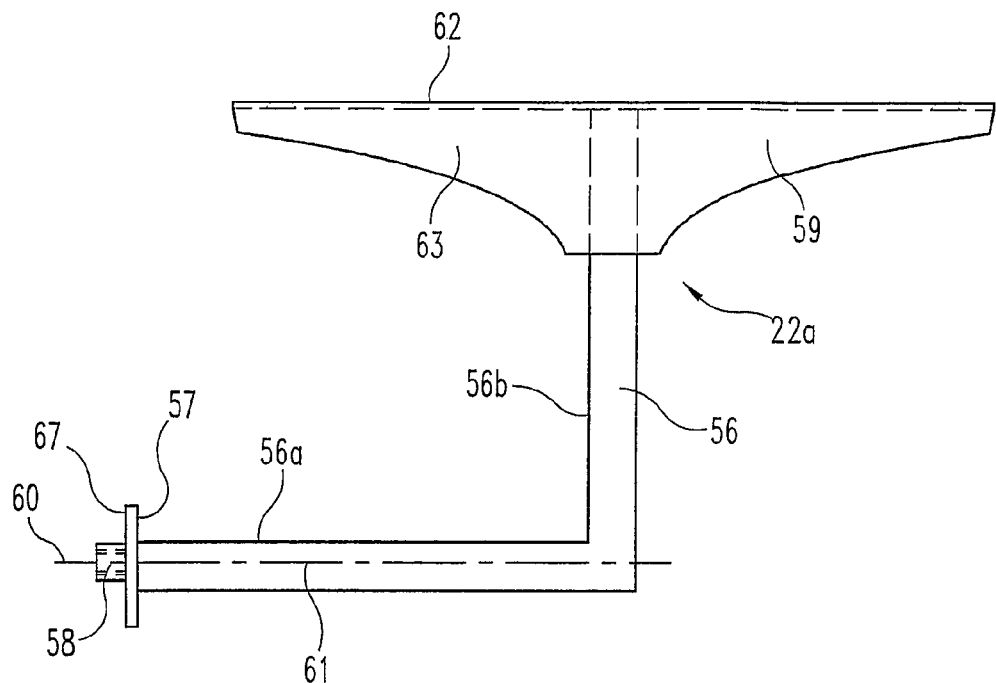
FIG. 8A is a side elevational view of the FIG. 7A left shelf arm.
Figure 8B:
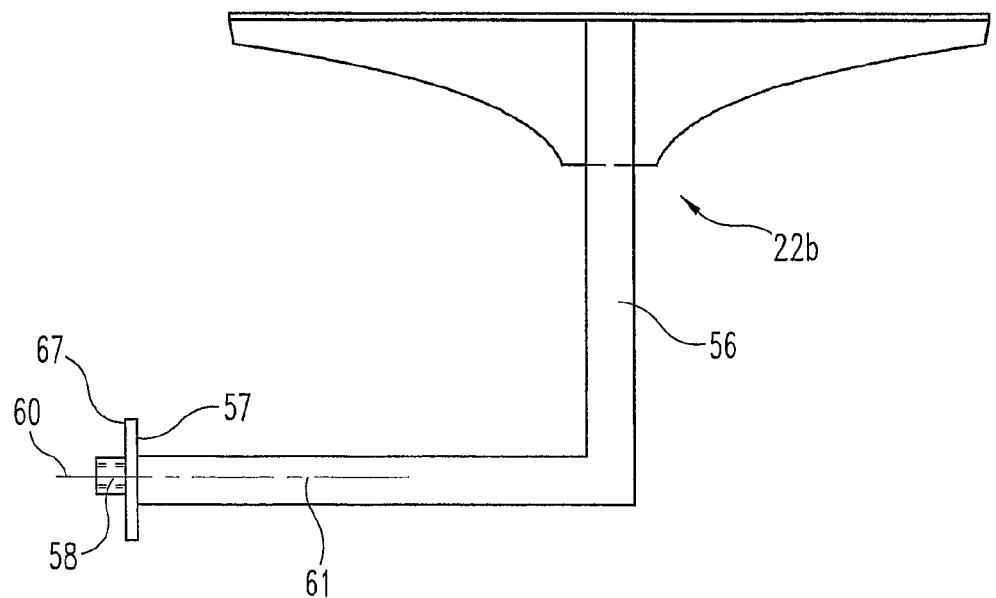
FIG. 8B is a side elevational view of the FIG. 7B right shelf arm.
Figure 9A:
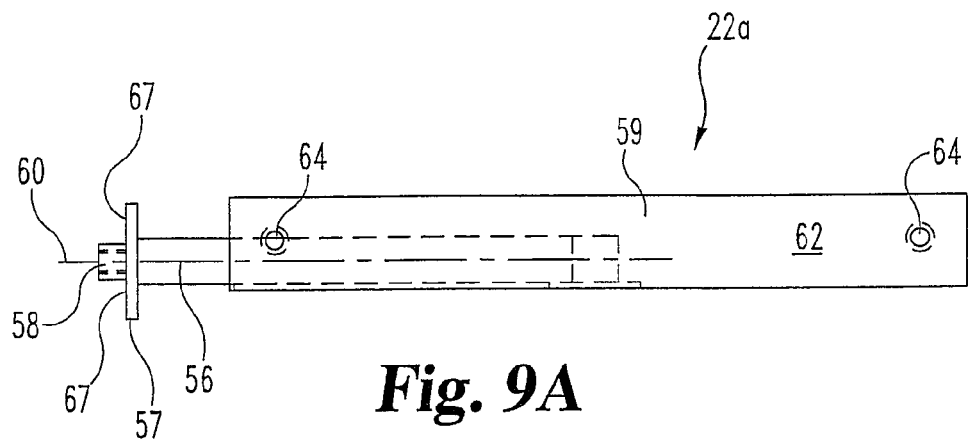
FIG. 9A is a top plan view of the FIG. 7A left shelf arm.
Figure 9B:
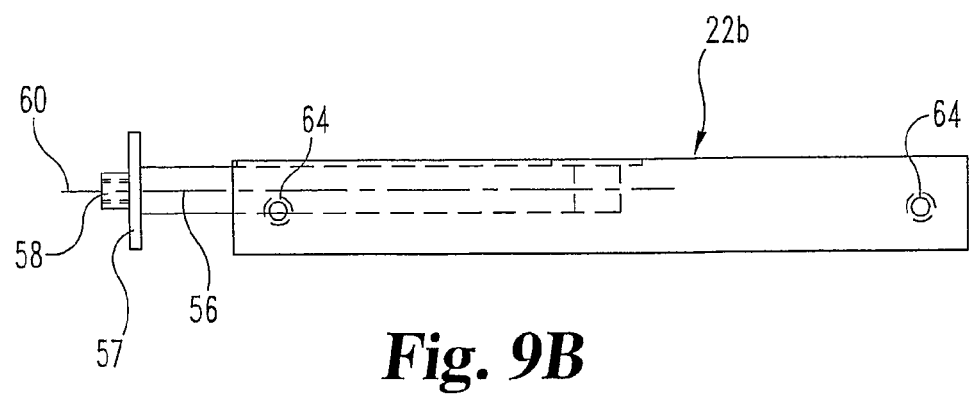
FIG. 9B is a top plan view of the FIG. 7B right shelf arm.
Figure 11:
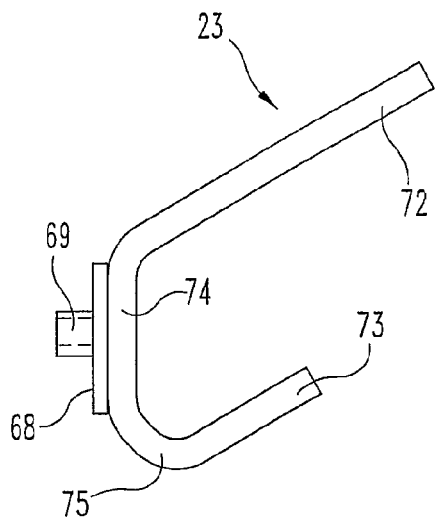
FIG. 11 is a side elevational view of a rail hook comprising one portion of the FIG. 1 display system.
Figure 13:
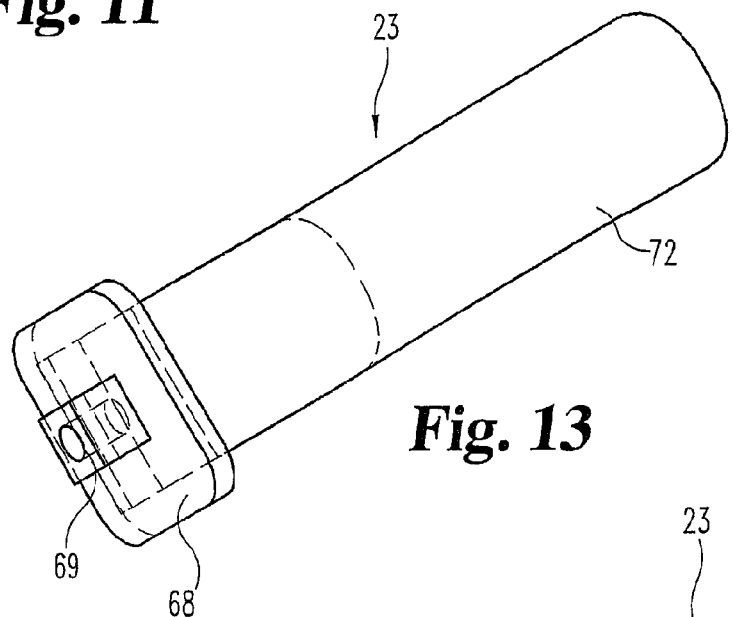
FIG. 13 is a perspective view of the FIG. 11 rail hook.
Figure 12:
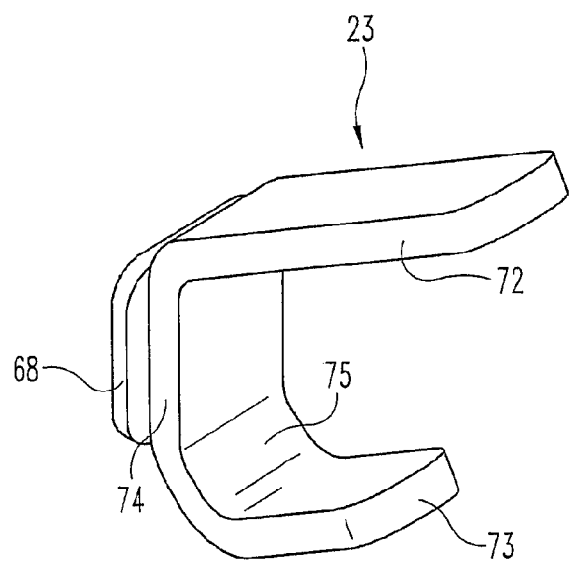
FIG. 12 is a perspective view of the FIG. 11 rail hook.
Figure 14:
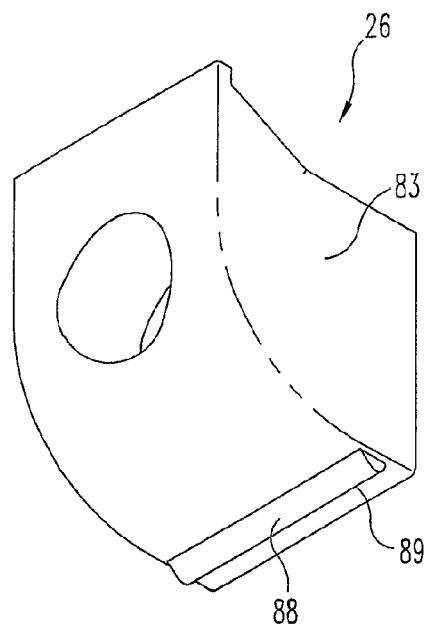
FIG. 14 is a perspective view of a puck comprising one portion of the FIG. 1 display system.
Figure 15:
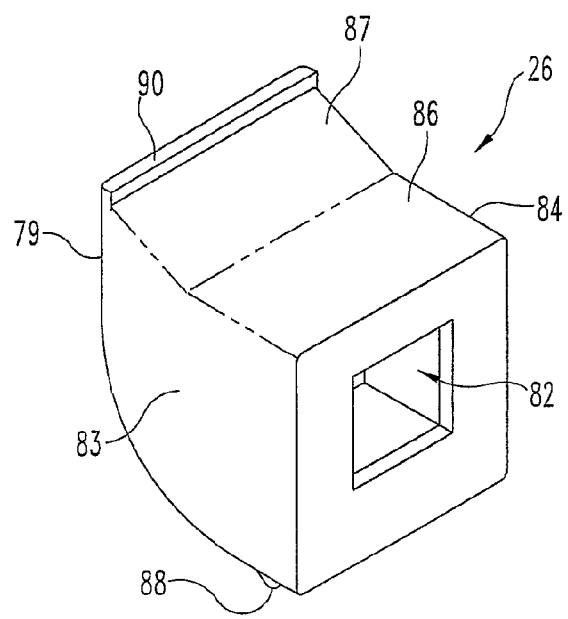
FIG. 15 is a perspective view of the FIG. 14 puck.
Figure 16:
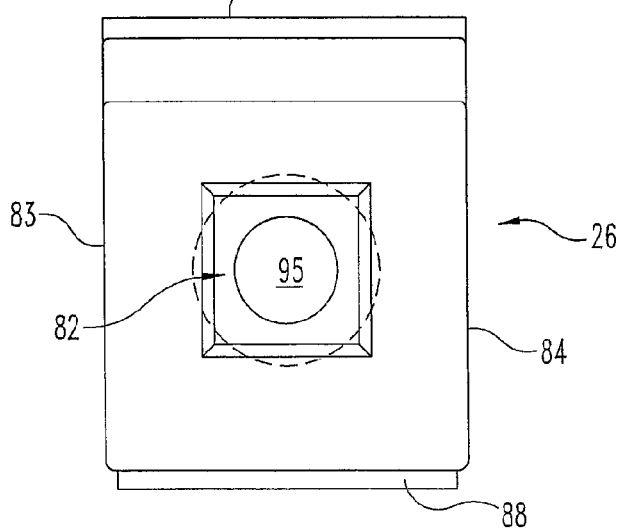
FIG. 16 is an end elevational view of the FIG. 14 puck.
Figure 17:
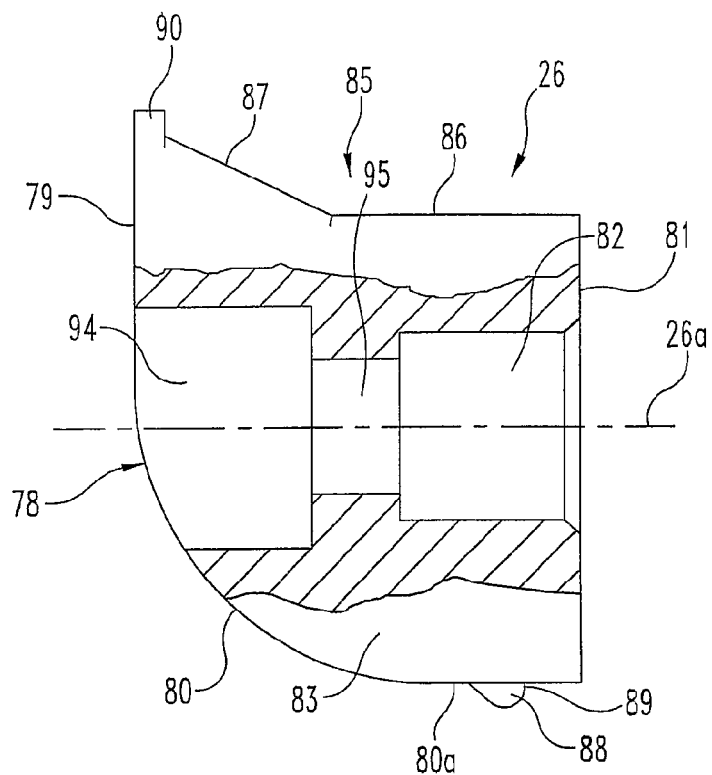
FIG. 17 is a fragmentary, side elevational view of the FIG. 14 puck.
Figure 18:
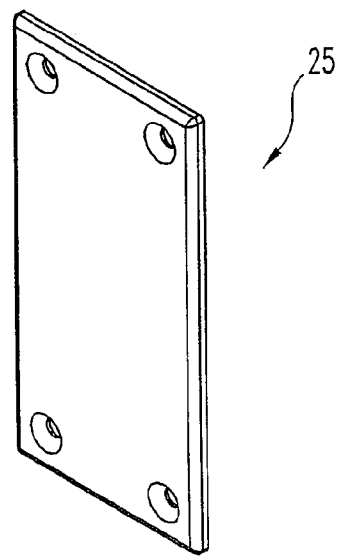
FIG. 18 is a perspective view of an endplate comprising one portion of the FIG. 1 display system.
Figure 19:
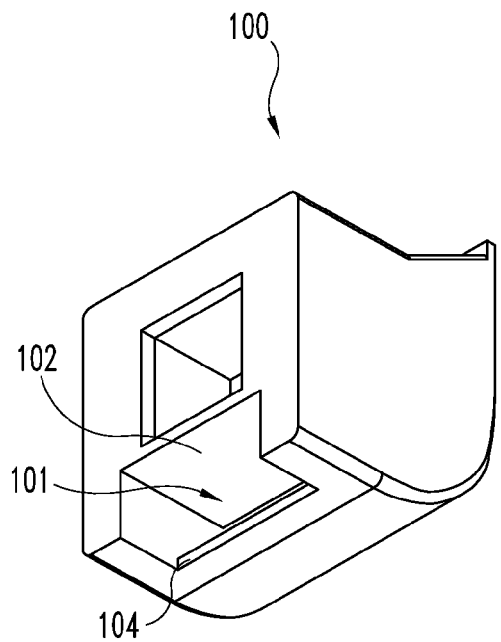
FIGS. 19-22 depict components of a modified puck insert component of and for use in systems of the invention.
Figure 20:
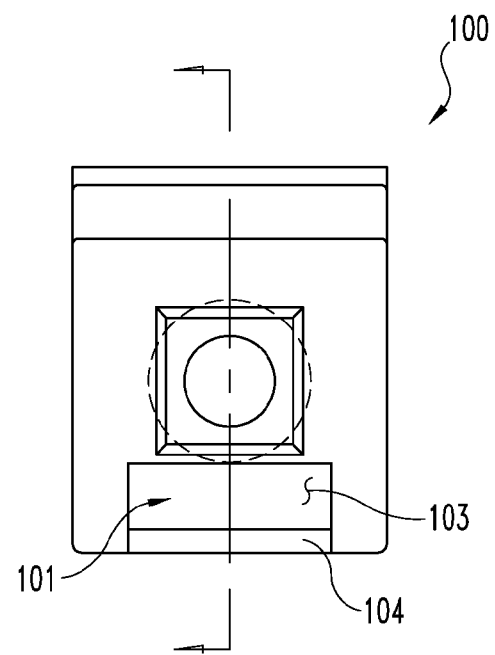
Figure 21:
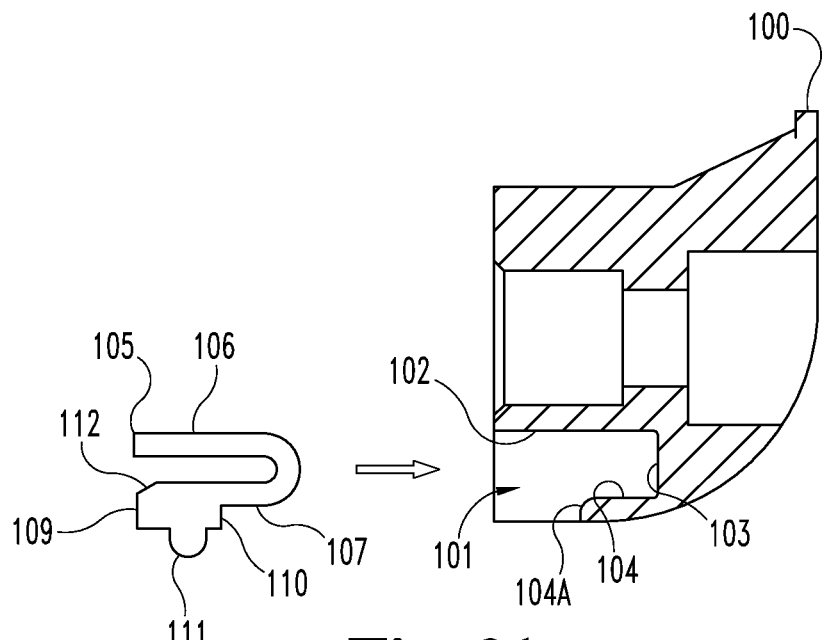
Figure 22:
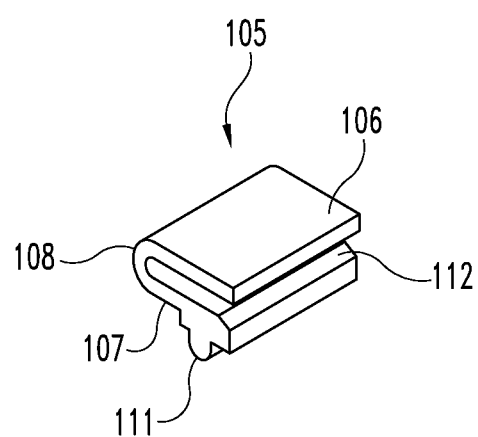
Figure 23:
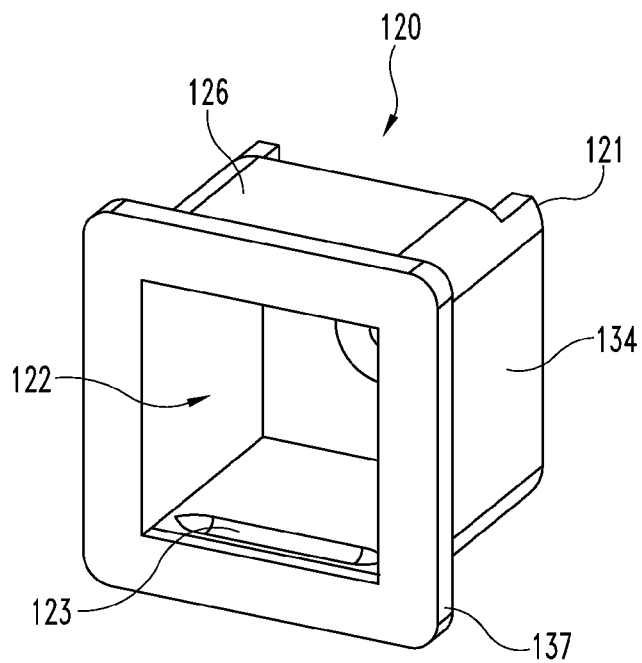
FIGS. 23-26 depict a receiver unit of and for use in support systems of the invention.
Figure 24:
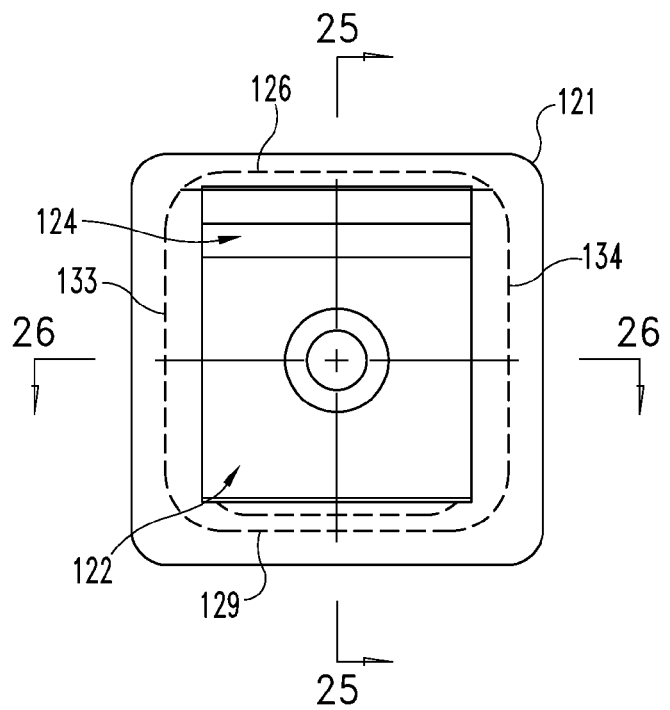
Figure 25:
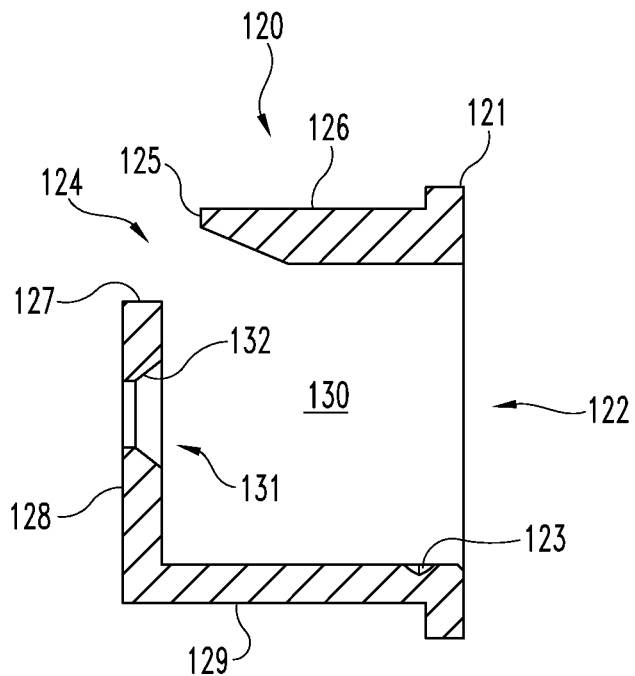
Figure 26:
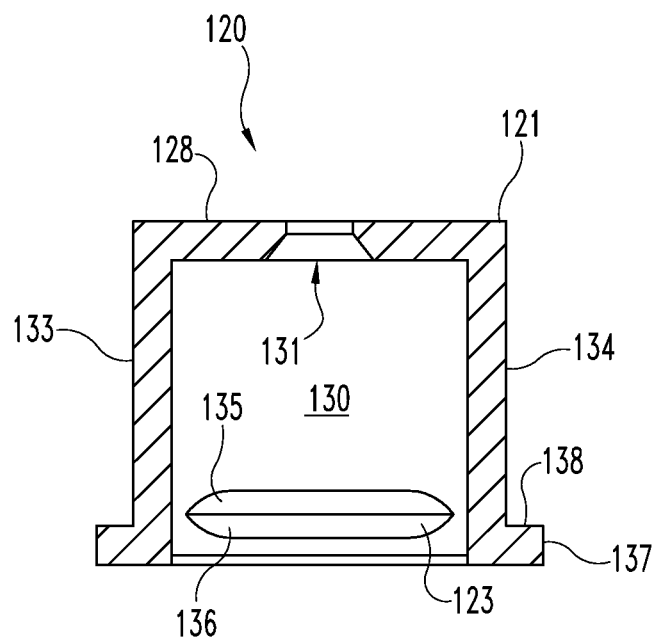

Referring to FIGS. 1-4, there is illustrated a display fixture 20 that is more fully described as a display hooks and shelving system with cantilevered supports. Display fixture 20 includes n extruded rail 21, a pair of spaced-apart shelf arms 22, a plurality of hooks 23 that can be spaced apart as desired, and a display shelf 24. Endplates 25 are attached to rail 21 at each end of rail 21 by the use of threaded fasteners. The rail 21 is constructed and arranged to receive the pair of shelf arms 22 and to receive the plurality of hooks 23 by the use of plug-like, insert components referred to herein as pucks 26, see FIGS. 14-17. The details of extruded rail 21 are illustrated in FIGS. 5 and 6. The details of the shelf arms 22 are illustrated in FIGS. 7A-10B. As will be described there is a left shelf arm 22a and a right shelf arm 22b. However, the majority of their construction is identical and the more generic use of reference number 22 is intended to mean both or either 22a and/or 22b. The details of display hooks 23 are illustrated in FIGS. 11-13. The endplate 25 is illustrated in FIG. 18.

With continued reference to FIGS. 1-4, display fixture 20 is constructed and arranged to be mounted to the exposed surface 30 of a support structure 31 that is preferably a substantially flat and substantially vertical structure, such as a room partition or a wall of a room or store, for example. While this represents the preferred construction and arrangement for support structure 31, it will be understood from the disclosure that the extruded rail 21 can be mounted to virtually any type of structure regardless of its shape, surface configuration or orientation. The preferred method of mounting display fixture 20 to structure 31 is by the use of threaded fasteners (not shown) that may cooperate with wall anchors (not shown) or may engage directly support structure 31. It is important that the selected structure 31 be of sufficient strength and rigidity to support not only the weight of display fixture 20, but also the weight of the articles to be placed on display shelf 24 and/or the articles to be hung on display hooks 23. Since the number and weight of these articles will change during the life cycle of display fixture 20, it is important to design the method of mounting and to select or design or construct an appropriate structure 31 with a sufficient safety factor in terms of its weight supporting capability to handle a worst-case condition. The extruded rail 21 includes a longitudinal centerline 21a that is substantially horizontal in the preferred mounting configuration of FIGS. 2 and 3.

The extruded rail 21 includes a specifically shaped interior channel 32 (blind) that is constructed and arranged to receive the insertion end of each shelf arm 22 and the insertion end of each hook 23, once these components have been properly assembled and fitted with a cooperating puck 26. As will be described herein in greater detail, the insertion end of each shelf arm and the insertion end of each display hook includes a securely attached puck 26. Since these insertion ends of these display components can be inserted into the shaped channel 32 at any location along the length of the channel, the spacing between the display hooks 23 is a design variable selected by the user or installer. Further, since the hooks 23 are individual components, their location in the channel 32 is not only up to the initial installer or user, but can also be changed during their life as the display of different articles might dictate. For example, hanging or displaying larger outer garments might require greater space between adjacent display hooks. As for the shelf arms 22, their spacing depends on where they are attached to shelf 24. Once attached to shelf 24, these two shelf arms 22 operate or function as a single unit. However, this unit can still be moved (as a unit) along the length of the shaped channel 32 to a desired location. This desired location can also be changed as the selection of particular articles may change. The spacing between the pair of shelf arms 22 remains fixed due to their fixed attachment to shelf 24. There is no required or fixed spacing between the display hooks 23 and the shelf arms 22, and thus there is some versatility and flexibility in how the display hooks are arranged between themselves and how they are arranged relative to the two shelf arms 22. One representative spacing of display hooks 23 and shelf arms 22 is illustrated in FIGS. 1 and 2. The relative positioning of hooks 23, arms 22, and shelf 24 relative to exposed surface 30 is illustrated in FIG. 3. It is also an option to remove one or more of the hooks 23 from rail 21 and/or remove the display shelf 24 and shelf arms 22 assembly from rail 21. The assembly of the two endplates 25 to the ends of rail 21 prevents the hooks 23 and the shelf arms 22 from sliding out of the shaped channel 32 when being moved along the length of channel 32. This use of the two endplates 25 is in addition to their use for the aesthetic appearance.

While the construction and assembly of the components parts that create the display fixture 20 of FIG. 1 is not affected by the manner of mounting or attaching the extruded rail 21 to the support structure 31, it is most likely that rail 21 will be attached to the support structure 31 with a substantially horizontal orientation and this is illustrated in FIGS. 2 and 3. Further, each puck 26 has an axial centerline 26a that is centered through the interior openings 82, 95 and 95, see FIGS. 14-17. Centerline 26a is perpendicular to centerline 21a.

Referring now to FIGS. 5 and 6, extruded rail 21 has a generally rectangular shape in lateral cross section. Upper surface 35 is generally rectangular, substantially flat, and substantially parallel to lower surface 36 which is also generally rectangular in shape and substantially flat. The rear surface is substantially flat and includes three rear surface portions 37, 38, and 39 that define the openings to interior channels 40 and 41. The substantially flat front surface includes front surface portions 42 and 43 that define the opening for shaped channel 32. The upper interior corners 40a and 40b of channel 40 are constructed and arranged as cylindrical forms for receiving the threaded fasteners 44 that are used to attach endplates 25 to the exposed ends of the extruded rail 21 (see FIGS. 1 and 3). A similar construction exists for the lower interior corners 41a and 4ab of channel 41. These cylindrical forms are used to complete the attachment of endplates 25. The four-clearance hole pattern in each endplate 25 dimensionally corresponds to the spacing and pattern of the four interior corner cylindrical forms 40a, 40b, 41a, and 41b. The rectangular shape and size of each endplate 25 corresponds to the lateral cross section (rectangular) shape and size of extruded rail 21. The effect of this sizing and shaping is to provide a clean and neat finished appearance, as illustrated in FIG. 1, without any noticeable offset edges or gaps between endplate 25 and the periphery of rail 21, as viewed from either end of rail 21.

The remainder of the shaping of each channel 40 and 41 accomplishes another beneficial result. By reducing the amount of material of rail 21, the weight of the rail is reduced, thereby contributing to the efficient and effective design of rail 21. Shaped channel 32 includes an upper, inner corner trough 48 with a substantially square lateral cross section and a lower, outer groove 49. The other surfaces of the extruded and shaped channel 32 include horizontal upper surface 50, inclined surface 51, flat rear wall portion 52, and curved interior surface 53. Trough 48 and groove 49 receive portions of each puck 26. The interfit of portions of puck 26 within trough 48 and within groove 49 help to stabilize the installed display structures such as display hooks 23 and shelf arms 22 against lateral forces due to side impact. Forces that might tend to deflect the display structures moving centerline 26a off of its perpendicular relationship to centerline 21a are resisted by the described interfit of the puck 26 portions into trough 48 and groove 49 of channel 32. Straight vertical pull out of a puck 26 from within channel 32 is prevented, in part, by the interfit of a puck 26 rib into trough 48 and in part by the dimensional sizes. Removal, like insertion, involves a pivoting movement of the puck 26 relative to the shaped interior form of channel 32.

Referring now to FIGS. 7A-10B, the shelf arms 22 are illustrated. The left shelf arm 22a is illustrated in FIGS. 7A, 8A, 9A, and 10A. The right shelf arm 22b is illustrated in FIGS. 7B, 8B, 9B, and 10B. Since these two constructions are virtually identical, except for the left-right change to the bent angle support, only the left shelf arm is being described in detail. Thereafter, the generic reference to shelf arm 22 will continue to be used with the understanding that it applies to and denotes 22a and 22b. Shelf arm 22a includes a right angle tube 56, a back plate 57, an internally-threaded square nut 58, and a bent angle support 59. The axis line 60 of square nut 58 coincides with the longitudinal axis 61 of portion 56a and these axis lines are substantially parallel to the substantially flat, upper surface 62 of support 59. Portion 56b is substantially perpendicular to portion 56a and intersects support 59 at its longitudinal center up against side panel 63. The side panel 63 is formed at a substantially right angle relative to upper surface 62 and this construction adds support and rigidity to support 59. Axis lines 60 and 61 are coaxial with puck 26 centerline 26a.

Support 59 defines two clearance holes 64 that can be used for the drilling of pilot holes into display shelf 24 for securely attaching shelf arms 22 to display shelf 24. Holes 64 are countersunk from the underside surface of support 59. The attachment of support 59 to display shelf 24 is achieved by the use of threaded fasteners, preferably flat head screws. The upper surface 62 lays flush up against the underside of display shelf 24 and the flat head screws fit flush into the countersunk recesses.

Back plate 57 has a rear surface 67 that is substantially flat and symmetrically surrounds the square nut 58. As will be described, the square nut 58 cooperates with a threaded fastener in order to attach a puck 26 to each square not 58. This is the construction for both shelf arms 22 (i.e., 22a and 22b) as well as for each display hook 23.

Referring now to FIGS. 11-13, a representative display hook 23 is illustrated, though it should be understood that the specific hook shape, as well as its size, are optional characteristics. What is most important is the standardizing of the back plate 68 and square nut 69. These two portions have a size, shape, and overall construction that is virtually identical to back plate 57 and square nut 58 as illustrated and used with each shelf arm 22. This virtually identical construction means that the same puck 26 construction is compatible. So long as the same construction for a back plate and a square nut is used, a puck 26 can be properly and securely attached. With a puck 26 properly and securely attached, whatever the remainder of the form might be for the display component, whether a shelf arm, a hook or something else, it is possible to properly and securely insert the puck 26 into the shaped channel 32 with the desired fit and preferred method of connection. This means that virtually any type of display or support structure can be inserted into the extruded rail 21 so long as the "standardized" puck 26 is properly attached, which in turn suggests the use of a back plate and a square nut as the preferred construction.

Hook 23 includes a flat form shaped into an upper prong 72, lower lip 73, rear wall 74, and curved section 75. As noted, the particular size, shape, and styling of hook 23 are variables, considering that its primary purpose is to display articles. Consequently, depending on whether those articles are going to be supported by hangers or some other type of presentation device, that will influence the particular styling of the hooks 23. The back plate 68 is integral with the outer surface of rear wall 74. The included angle between prong 72 and rear wall 74 is approximately 120 degrees. The included angle between lower lip 73 and rear wall 74 is approximately 60 degrees. In terms of relative sizes for illustrative purposes only, upper prong 72 is between 2.5 and 3.0 inches in length and approximately 0.87 inches in width. Lower lip 73 is approximately 1.2 inches in length and 0.87 inches in width. Rear wall 74 is approximately 1.2 inches in height and 0.87 inches in width.

Referring now to FIGS. 14-17, the "standard" puck 26 for compatible insertion into shape channel 32 includes a specific contoured shape that facilitates the preferred manner of assembly and use. Puck 26 includes a forward face 78 with a substantially flat upper portion 79 and a lower curved portion 80 that flattens out into portion 80a. A substantially flat rear face 81 has a substantially square shape symmetrically surrounding a square-shaped opening 82. Sides 83 and 84 are substantially flat and parallel to each other. The upper surface 85 includes a substantially flat portion 86 and an inclined portion 87. Rear face 81 is substantially perpendicular to sides 83 and 84 and portion 86 and is substantially parallel with upper portion 79. Provided as part of portion 80a is a depending rib 88 which is rounded and angled toward rear face 81 with a curved free end 89. Provided at the edge junction between upper portion 79 and inclined portion 87 is a raised rib 90. Rib 90 is substantially square in lateral cross section and rectangular in longitudinal cross section.

Square-shaped opening 82 is in communication with larger cylindrical opening 94 via smaller cylindrical opening 95. These three openings are coaxially centered on puck centerline 26*a*. Opening 82 is constructed and arranged to receive the square nut 58 of whatever accessory component (display component) is being selected for insertion into shaped channel 32 of rail 21. The square nut 58 is sized for a close fit, but still within some slight clearance. These cooperating square shapes prevent any rotation of the accessory component within the puck 26. The square nut is internally-threaded for a ¼-20 thread and a headed, ¼-20 fastener (not shown) is used to complete and secure the puck 26 and square nut 58 connection. Opening 94 accepts the larger head of the threaded fastener, while opening 95 accepts the threaded body. With the threaded fastener fully tightened in place, the rear face 81 is pulled tightly up against back plate 57. The puck 26 and square nut 58 now function as an integral unit.

Puck 26 and shaped channel 32 are compatibly sized and shaped for a close interfit of puck 26 into channel 32. Direct horizontal insertion of puck 26 into channel 32 is not possible due to the projected vertical size of the channel opening relative to the overall vertical height of puck 26 from rib 88 to the top of rib 90. For example, this overall height of puck 26 is approximately 1.23 inches while the vertical height of the channel 32 opening is approximately 0.99 inches. Instead, proper insertion is achieved by pivoting the puck 26 in a counter clockwise direction based on the FIG. 6 orientation, assuming that rail 21 is aligned on both horizontal and vertical geometric planes. This pivoting motion lowers rib 90 below upper surface 50 and allows the rib 90 to be inserted into the shaped channel 32. Thereafter, the puck 26 is pivoted in a clockwise direction (still based on the FIG. 6 orientation) as the puck is pushed deeper into the shaped channel 32. Completed insertion (i.e., assembly) of the puck 26 positions rib 90 in trough 48 and positions rib 88 in groove 49. All other surfaces of puck 26 and channel 32 have a similar shape and close size conformance, as well as close positioning. For example, puck 26 measures approximately 0.969 inches from surface 80*a* to surface 86. Channel 32 measures approximately 0.995 inches for the opening from surface 50 to the lower surface that defines groove 49. As should be understood from the drawings and foregoing description, the puck 26 cannot be pulled out of channel 32 horizontally and any weight placed on the associated display component, such as a display hook 23, tends to try and pivot the puck 26 in a clockwise direction due to the cantilever arrangement of the hooks 23 and shelf arms 22 and the downward force that is applied at a distance outwardly from the rail 21. When it is desired to remove a display accessory, the particular item is pivoted upwardly in a counter clockwise direction, still based on FIG. 6 as the reference, and as this counter clockwise movement is being effected, the display accessory is pulled outwardly away from rail 21. With sufficient clearance between a puck 26 and the shaped channel 32, an inserted puck 26 can be manually moved laterally in either direction along the length of channel 32. This permits selectively positioning and spacing the hook 23, for example, after insertion into rail 21. As for the mentioned side impact forces that might twist the display accessory and perhaps cause the puck to pop out of its inserted position, the two ribs 80 and 90 and their interfit into troughs 48 and groove 49, respectively, provide bracing and stiffening to resist that type of side loading and twisting motion.

With reference now to FIGS. 19-22, shown is a modified puck of the invention. This puck has features that are generally the same as those of puck 26 described hereinabove, except modified as discussed below. For the sake of brevity, the above discussions regarding the features of puck 26 will not be repeated here. Modified pucks of the invention include a rib that is displaceable, e.g. movable or deformable, which can benefit its interaction with the groove 49 of rail 21 (see FIG. 6) or another similar receiving support structure. By having a displaceable rib, a smoother interaction with rail 21 is enabled, and/or the manufacturing tolerances for the rail or puck or both can be relaxed.

In the depicted embodiment of a modified puck, the puck includes a main body portion 100 and a separate rib component 105. Main body 100 defines a rearward-facing slot 101 into which rib component 105 is received, for example with a friction and/or snap fit. Slot 101 includes an upper wall 102, a rear wall 103, and a partial bottom wall 104. Bottom wall 104 is shorter than upper wall 102, and thus leaves slot 101 having openings both to the back and to the bottom of the puck main body 100. Bottom wall 104 also provides a vertically-extending shoulder 104A facing the back of the puck main body 100. Separate rib component 105 has an upper wall 106, a lower wall 107, and a connecting portion 108 connecting upper wall 106 and lower wall 107 and holding them in spaced relation to one another. Connecting portion 108 is desirably capable of resilient flexure so as to allow walls 106 and 107 to travel closer to one another when the clip component 105 is compressed. Bottom wall 107 has a thickened region 109 providing an inward shoulder 110 which is received against shoulder 104A of puck main body 100 when rib component 105 is fully received within slot 101. A downwardly depending rib 111 extends from thickened region 109.

In use together, rib component 105 is received within slot 101 of puck main body 100 under slight compression to stabilize the fit. This slight compression nonetheless leaves walls 106 and 107 spaced from one another such that further flexure of the rib component 105 will position walls 106 and 107 closer to one another, and thus reposition rib 111. With puck body 100 and rib component 105 combined in this fashion, the modified puck can be used in the same fashion as puck 26 discussed hereinabove. As such a modified puck is received into slot 32 of rail 21, contact of rib 111 with rail 21 displaces rib 111 upwardly toward puck main body 100 thus allowing clearance of the puck overall for receipt within slot 32. Rib 111 then comes to reside within groove 49 of rail 21. In certain embodiments, rib 111 can reside in groove 49 under compression such that rib 111 will be forcibly pressed against groove 49. In other embodiments, the receipt of rib 111 into groove 49 can be substantially neutral as regards compression.

It will be understood that other modified pucks are contemplated as being within the invention, which provide a rib for receipt within groove 49 which deforms, deflects or otherwise moves in order to provide clearance during insertion of the puck, to provide a compressed receipt of the rib within groove 49, and/or to otherwise ease insertion or removal of the puck from the rail 21. In certain embodiments, the puck main body 100 and rib component 105 are made out of the same material. In other embodiments, they are made out of differing materials. For example, in certain embodiments the puck main body 100 can be made out of metal, such as aluminum, and the rib component 105 or another secondary rib component can be made out of plastic. Plastics can provide a deformable rib portion to provide smoother operation with a rail or receiver even in the absence of flexure such as that provided by rib component 105. Thus, solid rib components made from a plastic that is deformable can be connected to puck main bodies, e.g. received within slots of puck main bodies, where the main bodies are made from a less deformable material such as a metal. Alternatively, the modified puck can be provided as an integral structure with a depending rib element that deforms or flexes during passage into the rail 21 or a similar receiver, and comes to rest within groove 49. These and other embodiments in which the rib of the puck is modified to enhance the operation of the puck with the rail are contemplated as being within the present invention.

With reference now to FIGS. 23-26, shown is a receiver 120 that can be used in place of or in addition to rails (e.g. rail 21) as disclosed herein, to receive pucks which in turn support other useful structures. Receiver 120 includes a receiver body 121 defining a front opening 122. Receiver body 121 defines an internal chamber 130. Provided on the bottom surface of chamber 130 is a groove 123 at or near its forward edge. Body 121 also defines a rearward opening 124 for receiving upper portions of pucks as disclosed herein, including their upwardly-extending ribs (see e.g. rib 90 in FIG. 15 and corresponding structure in FIG. 19). Generally speaking, the operations of receivers 120 with inserted pucks will correspond to those of rail 21 described previously. With the puck received within receiver 120, the upwardly-extending rib of the puck (e.g. 90, FIG. 15) will have an inner face resting against upper boundary wall 125 of opening 124. Wall 125 is provided by an upper wall 126 of the receiver 120. Opening 124 also includes a rear boundary wall 127 provided by rear wall 128 of receiver 120. Receiver 120 also includes a bottom wall 129 as well as side walls 133 and 134, which participate in defining chamber 130. Receiver 120 further includes an opening 131 defined in rear wall 128 for receiving a connector or other mounting structure by which receiver 120 can be mounted to another structure such as a wall. Preferably, opening 131 includes a beveled portion 132, e.g. for receiving the head of a connector such as a screw. The groove 123 is desirably a beveled structure including a first beveled face 135 and a second beveled face 136 intersecting one another at the bottom of the groove 123. It will be understood, however, that other configurations for the groove 123, including for example rounded or squared configurations, can be used within aspects of the invention.

Generally in use, one or a plurality of receiver units 120 can be mounted to a wall or other structure, and can then be used to support other articles as disclosed herein. It is also possible to use a combination of receiver units 120 and rails 21 in an overall system, wherein separate articles can be separately supported by receivers 120 and rails 21, or articles can be supported in part by each of one or more receivers 120 and one or more rails 21. These and other combinations will be readily apparent to the those working in the field.

The preferred materials for each component part of display fixture 20 include aluminum or another metal for rail 21, metal for shelf arms 22, metal with a polished chrome finish for hooks 23, wood veneer for display shelf 24, steel with a polished chrome finish for end plate 25, metal (e.g. aluminum or steel) and/or plastic for puck 26 and modified puck 100/105, and metal (e.g. aluminum or steel) and/or plastic for receiver 120. It will be understood that other suitable materials may also be used.

While certain embodiments using the inventive support systems have been shown, many other utilitarian structures can be partially or fully supported by rail/receiver and puck combinations as described herein. These include, for example, useful structures or articles that commonly occur in kitchens, closets, bathrooms, utility rooms, or bedrooms, including for instance racks, cabinets, shelves, hangers, hangbars, drawers, organizers, hooks, desks, and the like. In certain embodiments, these utilitarian structures are connected to one or a plurality of pucks, e.g. directly or through support rods, and the puck(s) are supported by a rail and/or receiver as disclosed herein, e.g. mounted to a wall or other vertical body. In some cases, the utilitarian structure will include one or multiple downwardly-depending elements (e.g. bumpers) that contact the wall or other vertical body at a point below the rail or receiver. These and other variations are contemplated as being within the spirit and scope of the present invention.

Additional systems that can incorporate rails, pucks and potentially other components disclosed herein are disclosed in the provisional U.S. Patent Application Ser. No. 60/898,539 of Kirk J. Botkin entitled SHELVING SYSTEMS AND COMPONENTS THEREFOR filed on Jan. 31, 2007, which is hereby incorporated by reference in its entirety for all purposes, including for disclosures of other components and systems to be supported by rail/puck components as disclosed herein.

While the preferred embodiment of the invention has been illustrated and described in the drawings and foregoing description, the same is to be considered as illustrative and not restrictive in character, it being understood that all changes and modifications that come within the spirit of the invention are desired to be protected.

What is claimed:

1. A display system for the presentation of articles, said display system comprising:
    an elongated support rail defining a shaped channel including an upper trough portion, a lower groove portion, and a curved interior surface portion between the upper trough portion and the lower groove portion, said elongated support rail being constructed and arranged for secure connection to a support structure;
    at least one insert component defining an interior opening, said at least one insert component having a shaped exterior corresponding to a portion of said shaped channel, said shaped exterior including a curved forward face portion corresponding in shape to the curved interior surface portion of the shaped channel, wherein the insert component includes a downwardly depending rib portion having a curved free end and an upwardly directed rib portion that is substantially rectangular in longitudinal cross section, wherein when the insert component is received within the shaped channel the downwardly depending rib portion is interfit within the lower groove portion and the upwardly directed rib portion is interfit within the upper trough portion, and wherein said downwardly depending rib portion is deformable for compression fit within the lower groove portion;
    at least one shelf support member including a securement portion constructed and arranged for receipt by the interior opening of a corresponding insert component; and
    a shelf attached to said at least one support shelf member.

2. The display system of claim 1 wherein said shaped channel includes a horizontal upper surface transitioning to an inclined upper surface, with the inclined upper surface terminating at said upper trough portion.

3. The display system of claim 2 wherein said at least one insert component further includes an upper surface having a substantially flat portion transitioning to an inclined portion.

4. A support system, comprising:
    an elongated support rail having a front surface and a rear surface, the support rail defining a shaped channel including an upper trough portion, a lower groove portion, and a curved interior surface portion between the upper trough portion and the lower groove portion, with said upper trough portion being closer to the rear surface of the support rail than is said lower groove portion, said elongated support rail being constructed and arranged for secure connection to a support structure;

at least one insert component defining an interior opening, said at least one insert component having a shaped exterior corresponding to a portion of said shaped channel, said shaped exterior including a curved forward face portion corresponding in shape to the curved interior surface portion of the shaped channel, wherein the insert component includes a downwardly depending rib portion and an upwardly directed rib portion, wherein when the insert component is received within the shaped channel the downwardly depending rib portion is interfit within the lower groove portion and the upwardly directed rib portion is interfit within the upper trough portion, and wherein the downwardly depending rib portion is deformable for compression fit within the lower groove portion; and at least one element to be supported including a securement portion constructed and arranged for receipt by the interior opening of a corresponding insert component.

5. The display system of claim 4 wherein said shaped channel includes a horizontal upper surface transitioning to an inclined upper surface.

6. The display system of claim 4 wherein said at least one insert component further includes an upper surface having a substantially flat portion transitioning to an inclined portion.

7. A system for the presentation or storage of articles, said system comprising:

an elongated support rail defining a shaped channel including an upper trough portion, a lower groove portion, and a curved interior surface portion between the upper trough portion and the lower groove portion, said elongated support rail being constructed and arranged for secure connection to a support structure;

a plurality of insert components, each one defining an interior opening, each insert component of said plurality having a shaped exterior corresponding to a portion of said shaped channel, said shaped exterior including a curved forward face portion corresponding in shape to the curved interior surface portion of the shaped channel, wherein the insert component includes a downwardly depending rib portion and an upwardly directed rib portion, wherein when the insert component is received within the shaped channel the downwardly depending rib portion is interfit within the lower groove portion and the upwardly directed rib portion is interfit within the upper trough portion;

at least one shelf support member including a securement portion constructed and arranged for receipt by the interior opening of a corresponding insert component;

a shelf attached to said at least one support shelf member; and at least one hook member including a securement portion constructed and arranged for receipt by the interior opening of a corresponding insert component.

8. The display system of claim 7 wherein said shaped channel includes a horizontal upper surface transitioning to an inclined upper surface.

9. The display system of claim 8 wherein each insert component of said plurality includes an upper surface having a substantially flat portion transitioning to an inclined portion.

10. The display system of claim 8 wherein said downwardly depending rib portion is deformable or deflectable for compression fit within the lower groove portion.

\* \* \* \* \*